G. H. FORSYTH.
VEHICLE WHEEL.
APPLICATION FILED NOV. 28, 1913.
1,195,194.
Patented Aug. 22, 1916.
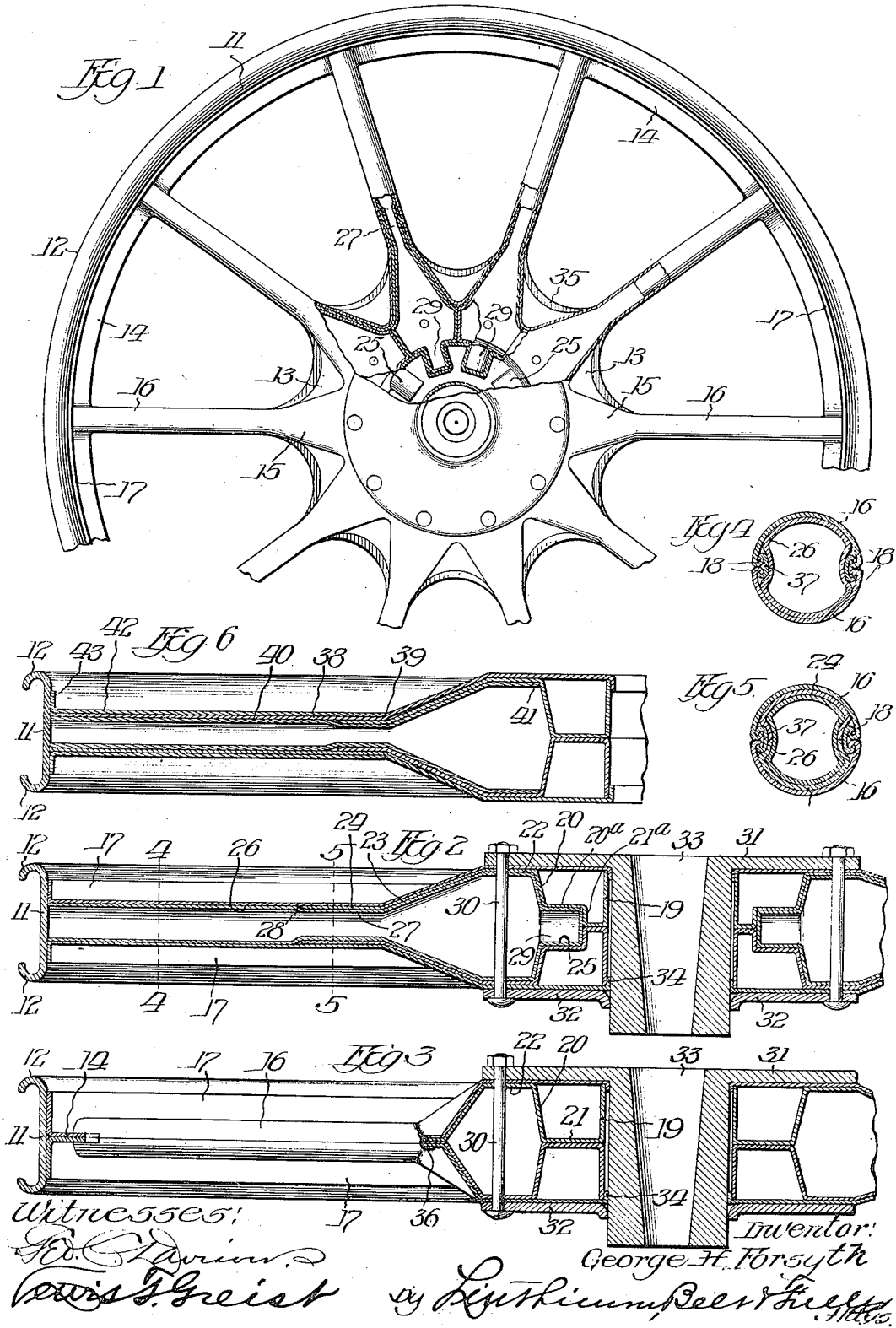

UNITED STATES PATENT OFFICE.

GEORGE H. FORSYTH, OF CHICAGO, ILLINOIS, ASSIGNOR TO FORSYTH BROTHERS COMPANY, OF CHICAGO, ILLINOIS, A CORPORATION OF ILLINOIS.

VEHICLE-WHEEL.

1,195,194.  Specification of Letters Patent.  Patented Aug. 22, 1916.

Application filed November 28, 1913. Serial No. 803,464.

*To all whom it may concern:*

Be it known that I, GEORGE H. FORSYTH, a citizen of the United States, residing at Chicago, in the county of Cook and State of Illinois, have invented certain new and useful Improvements in Vehicle-Wheels, of which the following is a specification.

The object of the invention is to provide a pressed metal wheel of improved construction which shall possess the highest degree of strength and resistance to strains and shocks applied either in the plane of the wheel or at an angle thereto.

The wheel is particularly adapted for hard usage as for instance in connection with motor vehicles and is preferably made of pressed steel although obviously it could be advantageously used in other connections and where metals other than steel would be found suitable.

In the accompanying drawing and in the description based thereon is set forth a preferred embodiment of the invention as also certain modified features of construction. As, however, the invention is susceptible of embodiment in other and varied constructional forms the drawing and description are to be construed in an illustrative and not in an unnecessarily limiting sense.

In the drawing—Figure 1 is a side elevation of a portion of such a wheel having certain parts broken away to reveal the interior; Figs. 2 and 3 are sections on a larger scale taken on the lines 2—2 and 3—3 of Fig. 1 respectively; Figs. 4 and 5 are cross sections through the spokes taken on the lines 4—4 and 5—5 of Fig. 2 respectively; and Fig. 6 is a section similar to Fig. 2 but of a modified form of construction.

The wheel in general comprises a hollow shell construction divided substantially in the medial plane of the wheel, each half comprising a peripheral rim portion, a single hub portion and a series of spokes extending radially therebetween. The peripheral rim 11 is of the conventional C-shape providing overhanging side flanges 12—12 for the reception and retention of a pneumatic tire. That portion of the wheel within the rim is formed by punching and pressing from two circular blanks of sheet steel so as to provide a central disk portion 13 with narrow strips radiating therefrom and connected at their outer ends by a web 14. By a suitable pressing operation the disk portion 13 is dished and also provided with radiating ribs or channels 15, which channels continue radially throughout the strips and a portion of the web 14 forming semi-tubular or half round spoke members 16. At the outer termination of the channels the material of the web 14 is flanged at a right angle as indicated at 17 to form the half of the wheel felly to which the rim 11 is suitably secured as by welding or otherwise.

Each of the spoke members formed in the pressing operation is integral with the central disk and the peripheral web has, in the form of construction shown in Figs. 1 to 5 inclusive, its edges reverse bent inwardly to form longitudinally extending lips 18, 18, facing in opposite directions as clearly shown in Figs. 4 and 5, these lips serving a function which will be hereafter described. Within the wheel shell, as thus far described, is mounted a reinforcing shell likewise divided in the medial plane of the wheel into two halves. Each half of this reinforcing shell comprises a sheet metal member pressed to form an annulus in the hub portion having a cylindrical inner wall 19, a depressed portion having the stepped walls 20, 21 and wall 22 which underlies and supports the central portion of the disk 13, and an oblique wall 23 extending from the annulus and lining the ribs 15 and having radiating tubular portions 24 projecting into the space between the spoke members 16. In line radially with the spokes 16 the walls 20 and 21 are pressed up as indicated at 20ª and 21ª so as to provide a series of sockets 25 adapted to receive and sustain the inner ends of interior spoke members 26 preferably integral and tubular in form, the outer portions of the spokes being substantially cylindrical and fitting snugly within the two half round spoke members 16, 16, while the inner portions are constricted as indicated at 27 to form outer shoulders 28 as abutments for the outer ends of the projections 24 while the inner portion of such interior spokes flare outwardly to a snug fit against the walls of the reinforcing shell and again are contracted at their inner ends 29 to fit within the sockets 25.

Each half of the wheel proper as above described has placed therein its half of the reinforcing shell, the contacting walls of the reinforcing shell and disk being connected together by welding, the tubular portions 24 being likewise welded to the spoke members 16. The reinforcing shell and the disk and spokes having been united by welding the two halves of the wheel thus formed are clamped upon the inner integral spoke members by means of the bolts 30 and the hub plates 31 and 32, the hub 33 itself lying snugly within the cylindrical walls 19 and inturned flanges 34 of the disks 13. The meeting peripheral edges of the disks 13 are then united by welding as indicated at 35 and they may be additionally secured together by an overlapping lip 36 formed integral with one of said disks, which may be also welded to the contacting parts.

As thus assembled the wheel has no rim but consists of the hub, spokes and peripheral web formed as a felly, the central portion being firmly united by the bolts 30 while the two halves of the spokes and felly lie loosely in contact. Into the open ends of the spokes are then inserted C-shaped strips 37 the inturned edges of which engage with the inturned edges of the spoke members 16 as clearly shown in Figs. 4 and 5. These strips or clips are driven longitudinally the full length of the spokes thus interlocking with the edges of the spoke members throughout and securely binding the same together. The rim 11 is then placed upon the felly and suitably secured as before noted.

In Fig. 6 is shown a form of construction which differs in some particulars from that previously described. In this form the spoke members 38 have plain edges which abut in flush relation instead of being provided with inturned edges. They are also provided at their point of merger with the ribs 15 with an offset having a depth corresponding to the thickness of the metal whereby to form a circular outwardly facing shoulder 39. The interior reinforcing shell in this instance is not provided with sockets as in the former case and interior spoke members 40 have their inner ends terminating at 41 being supported upon the wall of the reinforcing shell. The two halves are clamped together in the central portion by means of the hub plates and bolts as in the former case while the spoke members 38 are united by means of an external spoke member in the form of an integral sleeve 42 which incloses the spoke members and is driven longitudinally from the outer ends until its inner end abuts against the shoulder 39. The outer end of this outer enveloping spoke member is flanged as indicated at 43 and the rim 11 having been placed in position about the ends of the spokes is suitably secured to the flange 43 as by welding.

In both forms of construction it will be observed that the hub portion is efficiently reinforced by the internal lining or reinforcing shell, portions of which extend radially into the spokes. The spokes of the wheel in each case are multiplex, being duplex in that form of construction illustrated in Figs. 1 to 5 inclusive, and tri-plex in Fig. 6. In both forms the spoke members proper, which are integral with the hub portion of the wheel, are reinforced by inner spoke members which are substantially tubular and preferably integral while in the modified form they are additionally reinforced by the outer spoke members 42 which serve the double purpose of such reinforcement and also as means for binding the spoke members together, this latter function being performed in the preferred form of construction by the interlocking clips 35. In both forms of construction shown, the several overlying and contacting parts, as for instance the several telescopically arranged spoke layers, may be individually welded to each other and also welded together as a whole.

I claim:

1. In a pressed metal wheel, a hollow shell divided in a medial plane of the wheel and comprising a hub portion and spoke and felly portions, a hollow sheet metal reinforcing shell within the hub portion, and inner spokes disposed within and extending throughout the length of the first mentioned spokes, and means for securing together the halves of the divided spokes, substantially as described.

2. In a pressed metal wheel, a hollow shell divided in a medial plane of the wheel and comprising a hub portion and spoke and felly portions formed integral therewith, a hollow sheet metal reinforcing shell within the hub portion and having tubular portions projecting into the spokes, and inner tubular spokes disposed within and extending throughout the length of the first mentioned spokes, and means for securing together the halves of the divided spokes, substantially as described.

3. In a pressed metal wheel, a hollow shell divided in a medial plane of the wheel and comprising a hub portion and spoke and felly portions integral therewith, a hollow sheet metal similarly divided reinforcing shell within the hub portion and having tubular portions projecting into the spokes, and means for securing together the halves of the divided spokes, substantially as described.

4. In a pressed metal wheel, a hollow shell divided in a medial plane of the wheel comprising a hub portion, and spoke and felly portions formed integral therewith, a hollow sheet metal similarly divided reinforcing shell within the hub portion and provided with radially opening sockets, inner tubular spokes disposed between the two halves of the divided spokes and having their inner ends seated in the sockets, and means for securing together the halves of the divided spokes, substantially as described.

5. In a pressed metal wheel, a hollow shell divided in a medial plane of the wheel and comprising a hub portion, and spoke and felly portions formed integral therewith, a hollow sheet metal similarly divided reinforcing shell within the hub portion and provided with radially opening sockets, inner tubular spokes disposed between the two halves of the divided spokes and having their inner ends seated in the sockets, and interiorly arranged means for securing together the halves of the divided spokes, substantially as described.

6. In a pressed metal wheel, a hollow shell divided in a medial plane of the wheel comprising a hub portion, and spoke and felly portions formed integral therewith, a hollow sheet metal similarly divided reinforcing shell within the hub portion and provided with radially opening sockets, inner tubular spokes disposed between the two halves of the divided spokes and having their inner ends seated in the sockets, and a member slidably engaging the two halves of the divided spokes and binding the same together, substantially as described.

7. In a pressed metal wheel, a hollow shell divided in a medial plane of the wheel comprising a hub portion, and spoke and felly portions formed integral therewith, a hollow sheet metal similarly divided reinforcing shell within the hub portion and provided with radially opening sockets, inner tubular spokes disposed between the two halves of the divided spokes and having their inner ends seated in the sockets, the edges of the divided spoke members reverse bent, and a strip having reverse bent edges interlocked with the edges of the divided spokes to secure them together, substantially as described.

8. In a pressed metal wheel, a hollow shell comprising a hub portion and radial projections, spokes disposed within the projections and extending into the shell, and means within and integral with the shell providing a seat for the inner ends of the spokes, substantially as described.

9. In a pressed metal wheel, a hollow shell comprising a hub portion and radial projections, spokes disposed within the projections and extending into the shell, and means within and integral with the shell providing a socket as a seat for the inner ends of the spokes, substantially as described.

10. In a pressed metal wheel, a hollow shell comprising a hub portion and radial projections and spokes disposed within the projections and extending into the shell, the shell providing a radially facing shoulder as an abutment for a similar shoulder provided upon the spokes, substantially as described.

11. In a pressed metal wheel, a hollow shell comprising a hub portion and radial projections, spokes telescopically engaging the projections, one of the telescopic members provided with a shoulder abutment for the other telescopic member, substantially as described.

12. In a sheet metal wheel, a hollow shell comprising a hub portion and spoke portions, the hub portion provided with sheet metal spacing members extending inwardly from each side of the wheel into abutting contact with each other, substantially as described.

13. In a sheet metal wheel, a hollow shell comprising a hub portion and spoke portions, the hub portion provided with sheet metal spacing members extending inwardly from each side of the wheel into abutting contact with each other, said spacing members consisting of bottom and side walls of an inwardly depressed annulus, substantially as described.

In testimony whereof I have hereunto signed my name in the presence of two subscribing witnesses.

GEORGE H. FORSYTH.

Witnesses:
LEWIS T. GREIST,
T. D. BUTLER.